(12) United States Patent
Kudo et al.

(10) Patent No.: US 9,219,843 B2
(45) Date of Patent: Dec. 22, 2015

(54) COMMUNICATION TERMINAL AND COMPUTER READABLE MEDIUM

(75) Inventors: Nobuyuki Kudo, Kanagawa (JP);
Hirotaka Kawabata, Kanagawa (JP);
Isao Tanaka, Kanagawa (JP); Satoshi Watanabe, Kanagawa (JP); Hideki Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1460 days.

(21) Appl. No.: 12/870,578

(22) Filed: Aug. 27, 2010

(65) Prior Publication Data

US 2011/0235095 A1    Sep. 29, 2011

(30) Foreign Application Priority Data

Mar. 26, 2010 (JP) ................ 2010-071574

(51) Int. Cl.
*H04N 1/32* (2006.01)
*H04N 1/327* (2006.01)
*H04N 1/00* (2006.01)

(52) U.S. Cl.
CPC ....... *H04N 1/32614* (2013.01); *H04N 1/32641* (2013.01); *H04N 1/32678* (2013.01); *H04N 1/32797* (2013.01); *H04N 1/00214* (2013.01); *H04N 2201/0093* (2013.01)

(58) Field of Classification Search
CPC .................. H04N 1/32641; H04N 1/32614
See application file for complete search history.

(56) References Cited

U.S. PATENT DOCUMENTS

| 2002/0095516 | A1 | 7/2002 | Nada | |
|---|---|---|---|---|
| 2005/0190403 | A1* | 9/2005 | Nakamura | 358/1.15 |
| 2007/0189500 | A1* | 8/2007 | Stanford | 379/355.01 |
| 2009/0034015 | A1* | 2/2009 | Mulligan et al. | 358/408 |
| 2009/0049132 | A1* | 2/2009 | Livne Gutovski | 709/206 |

FOREIGN PATENT DOCUMENTS

| JP | 2001-160866 A | 6/2001 |
|---|---|---|
| JP | 2002-101198 A | 4/2002 |
| JP | 2004-187262 A | 7/2004 |
| JP | 2005-079929 A | 3/2005 |
| JP | 2007-306297 A | 11/2007 |
| WO | 2004/111749 A2 | 12/2004 |
| WO | 2005/022894 A1 | 3/2005 |

OTHER PUBLICATIONS

Japanese Office Action issued Sep. 11, 2012 in corresponding Japanese Patent Application No. 2010-071574.

* cited by examiner

*Primary Examiner* — Mohammad Ghayour
*Assistant Examiner* — Lennin Rodriguezgonzalez
(74) *Attorney, Agent, or Firm* — Sughrue Mion, PLLC

(57) ABSTRACT

A communication terminal that includes a first communication unit that is coupled to an IP (Internet Protocol) network and conducts a facsimile transmission through the IP network; a second communication unit that is coupled to a public telephone network and conducts a facsimile transmission through the public telephone network; a control unit that, in a case that a communication error is detected when the first communication unit calls to the IP network and that the address information used for calling to the IP network is the address information corresponding to the destination which is converted from the telephone number received by a reception unit, controls the second communication to call to public telephone network by using the telephone number received by a reception unit.

12 Claims, 8 Drawing Sheets

FIG. 2A

TELEPHONE NUMBER MANAGEMENT TABLE

| TELEPHONE NUMBER | TYPE | CALLER IDENTI-FICATION | RE-CALL PERMITTED/NOT PERMITTED | LINE NUMBER FOR RE-CALL | DOMAIN STRING FOR CONVERSION |
|---|---|---|---|---|---|
| 123-456-789 | DOMESTIC CALL | PERMITTED | PERMITTED | LINE #2 | ○○○.ne.jp |
| 000-111-222 | INTERNA-TIONAL CALL | PERMITTED | PERMITTED | LINE #3 | ○×△.co.xx |
| 999-999-999 | DOMESTIC CALL | NOT PERMITTED | NOT PERMITTED | — | □□□.ne.jp |
| ⋮ | ⋮ | ⋮ | ⋮ | ⋮ | ⋮ |

FIG. 2B

HISTORY MANAGEMENT TABLE

| DESTINATION INFORMATION | HISTORY | TRANSMISSION DATE OR RE-CEPTION DATE | TRANSMISSION START TIME OR RE-CEPTION START TIME | SETTING INFORMATION |
|---|---|---|---|---|
| 123-456-789@○×△.ne.jp | TRANSMISSION FAILED | 2010_03_03 | AM10:05 | RE-CALL |
| 000-111-222 | TRANSMISSION SUCCEEDED | 2010_03_03 | AM:10:07 | RE-CALL |
| ⋮ | ⋮ | ⋮ | ⋮ | ⋮ |

…

COMMUNICATION TERMINAL AND COMPUTER READABLE MEDIUM

CROSS-REFERENCE TO RELATED APPLICATION

This application is based on and claims priority under 35 USC 119 from Japanese Patent Application No. 2010-071574 filed on Mar. 26, 2010.

BACKGROUND (i) Technical Field

The present invention relates to a communication terminal and a computer readable medium.

(ii) Related Art

Recently, a communication terminal with a facsimile (FAX) function that is able to connect to an IP (internet Protocol) network and a public telephone network has been suggested.

SUMMARY

According to an aspect of the present invention, there is provided a communication terminal including a first communication unit that is coupled to an IP (Internet Protocol) network and conducts a facsimile transmission through the IP network; a second communication unit that is coupled to a public telephone network and conducts a facsimile transmission through the public telephone network; a communication error detection unit that detects a communication error of the first communication unit; a reception unit that receives address information that the first communication unit uses for calling to the IP network or a telephone number that the second communication unit uses for calling to the public telephone network as information to specify a destination for the facsimile transmission and receives a selection of a communication unit used for a facsimile transmission from the first communication unit and the second communication unit; a storage unit that stores conversion information for converting a received telephone number into address information that the first communication unit uses for calling to the IP network, in a case that the first communication unit is selected as the communication unit used for a facsimile transmission and the reception unit receives an input of the telephone number as the information to specify the destination; and a control unit that controls the first communication unit to call to the IP network by using the address information that the reception unit receives or the address information corresponding to the destination which is converted from the telephone number received by the reception unit by referring to the storage unit in a case that the communication unit selected through the reception unit is the first communication unit, and controls the second communication unit to re-call to the public telephone network by using the telephone number in a case that the communication error detection unit detects the communication error when the first communication unit calls to the IP network and that the address information used for calling to the IP network is the address information corresponding to the destination which is converted from the telephone number received by the reception unit.

BRIEF DESCRIPTION OF THE DRAWINGS

Exemplary embodiments of the present invention will be described in detail based on the following figures, wherein:

FIGS. 2A and 2B are diagrams illustrating the organization of management tables stored in an NVRAM, FIG. 2A is a diagram illustrating the organization of a telephone number management table, and FIG. 2B is a diagram illustrating the organization of a transmission/reception history management table;

DETAILED DESCRIPTION

A description will now be given, with reference to the accompanying drawings, of exemplary embodiments of the present invention.

Figure 1:
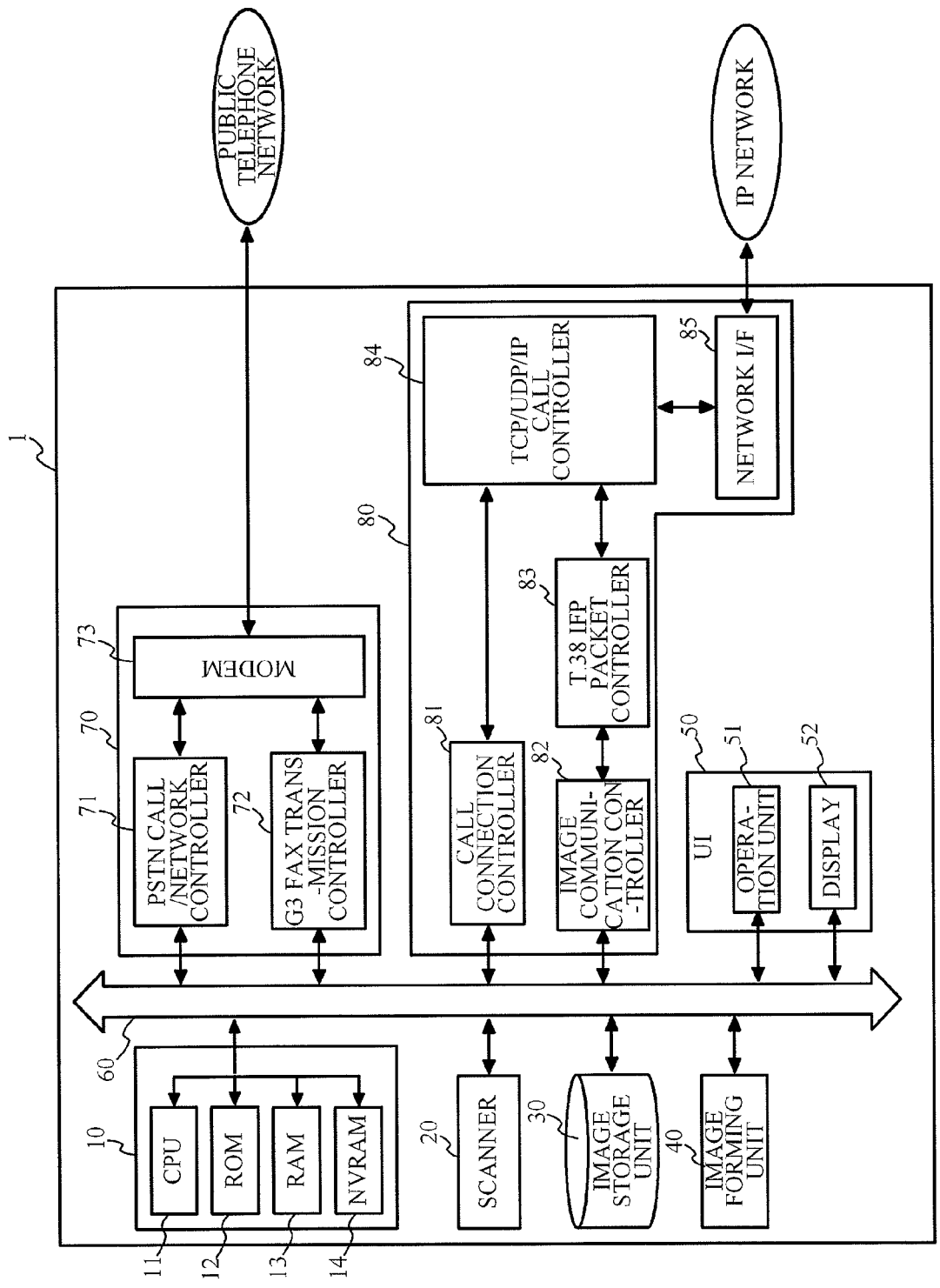
FIG. 1 is a block diagram illustrating the composition of a communication terminal.

A description will now be given of the composition of a communication terminal in accordance with a exemplary embodiment with reference to FIG. 1.

A communication terminal 1 is composed of a controller 10, a scanner 20, an image storage unit 30, an image forming unit 40, a user interface (hereinafter, referred to as a UI) 50, an analog FAX 70, and an IP-FAX 80 that are coupled to a bus 60.

The controller 10 is provided with a CPU (Central Processing Unit) 11, a ROM (Read Only Memory) 12, a RAM (Random Access Memory) 13, and an NVRAM (Non Volatile Random Access Memory) 14 as hardware. The ROM 12 stores control programs that the CPU 11 uses for the control. When the CPU 11 is started up, it reads control programs from the ROM 12, and stores them to the RAM 13. Then the CPU 11 executes processes according to programs stored in the RAM 13. The RAM 13 functions as a work memory for the CPU 11, and stores data that the CPU 11 uses for calculation. The NVRAM 14 stores data such as control data and system data that are maintained when the power of the communication terminal 1 is turned off.

The scanner 20 reads the image of an original document at given resolution optically. The image read by the scanner 20 is stored in the image storage unit 30 as image data according to the control by the controller 10.

The image storage unit 30 stores image data read by the scanner 20 and image data received by the analog FAX 70 and the IP-FAX 80.

The image forming unit 40 forms the image on a paper by a xerographic method conventionally known, for example.

The UI 50 functions as interface to display various information for a user, and to receive various operation from the user. The UI 50 includes an operation unit 51 and a display 52. The operation unit 51 has operation keys and operation buttons, and receives an operation input from the user. The display 52 has a display screen, and displays information to be notified the user of on the basis of the control by the controller 10. The display screen of the display 52 may be a Liquid Crystal Display (LCD) with a touch panel for example.

The analog FAX 70 conducts an analog FAX transmission by using an analog public telephone network (hereinafter, a facsimile transmission/reception conducted by the analog FAX 70 is referred to as an analog FAX transmission/reception), and is provided with a PSTN call/network controller 71, a G3 fax transmission controller 72 and a modem 73. The PSTN call/network controller 71 controls a call establishment and a network connection in the analog public telephone network. The G3 fax transmission controller 72 controls a facsimile protocol according to procedures according to ITU-T recommendations T.30. The modem 73 converts digital signal into analog signal and transmits the analog signal to the public telephone network. The modem 73 converts analog signal received from the public telephone network into digital signal, and transmits the digital signal to the PSTN call/network controller 71 or the G3 fax transmission controller 72.

The IP-FAX 80 includes a call connection controller 81, an image communication controller 82, a T.38 IFP packet controller 83, a TCP/UDP/IP call controller 84, and a network interface (hereinafter, referred to as a network I/F) 85, and controls network communication with internet protocol.

The call connection controller 81 executes a protocol processing of SIP (session initiation protocol), establishes and disconnects a session with the other communication terminal, and conducts the negotiation of communications capacity that the terminal has.

The image communication controller 82 controls ITU-T recommendations T.30 communication protocol, and achieves the image communication.

The T.38 IFP packet controller 83 controls an IFT packet layer protocol based on ITU-T recommendations T.38.

The TCP/UDP/IP call controller 84 controls protocol in a transport layer/network layer in the internet.

The network I/F 85 controls communications below a data link layer.

The facsimile transmission by the IP-FAX 80 is referred to as an IP-FAX transmission.

A description will now be given of a telephone number management table stored in the NVRAM 14, with reference to FIGS. 2A and 2B. FIG. 2A illustrates the organization of a telephone number management table. The telephone number management table stores identification information indicating whether the telephone number is for domestic call or international facsimile transmission, information indicating whether the telephone number is permitted to give a caller identification, information indicating whether a re-call is carried out in the facsimile transmission when the communication error occurs in the IP-FAX transmission, a telephone line number used for the re-call, and a domain string for conversion (corresponding to conversion information of the present invention), which is used for converting the telephone number into an address used in the IP-FAX transmission, in relation to a telephone number (telephone number used for the facsimile transmission) registered by the user. FIG. 2B illustrates a transmission/reception history management table that manages transmission/reception histories of the IP-FAX transmissions or the facsimile transmissions.

The transmission/reception history management table stores source/destination information to identify the source or destination, history information that indicates whether the IP-FAX transmission or an analog FAX transmission from the source or to the destination succeeded or failed, date of the transmission or reception, time information when the transmission or reception started, and setting information. The setting information is the information for deciding whether the re-call to the same telephone number with which the analog transmission failed is carried out when the image data which failed to be transmitted by the analog FAX transmission with the analog FAX 70 is stored in the image storage unit 30 and the user requests the retransmission. The setting information is set by the user in the initial setting of IP-FAX or analog FAX transmission for example.

The management tables stored in the NVRAM 14 are read out from the NVRAM 14 and stored in the RAM 13 when the controller 10 starts up.

Figure 3:
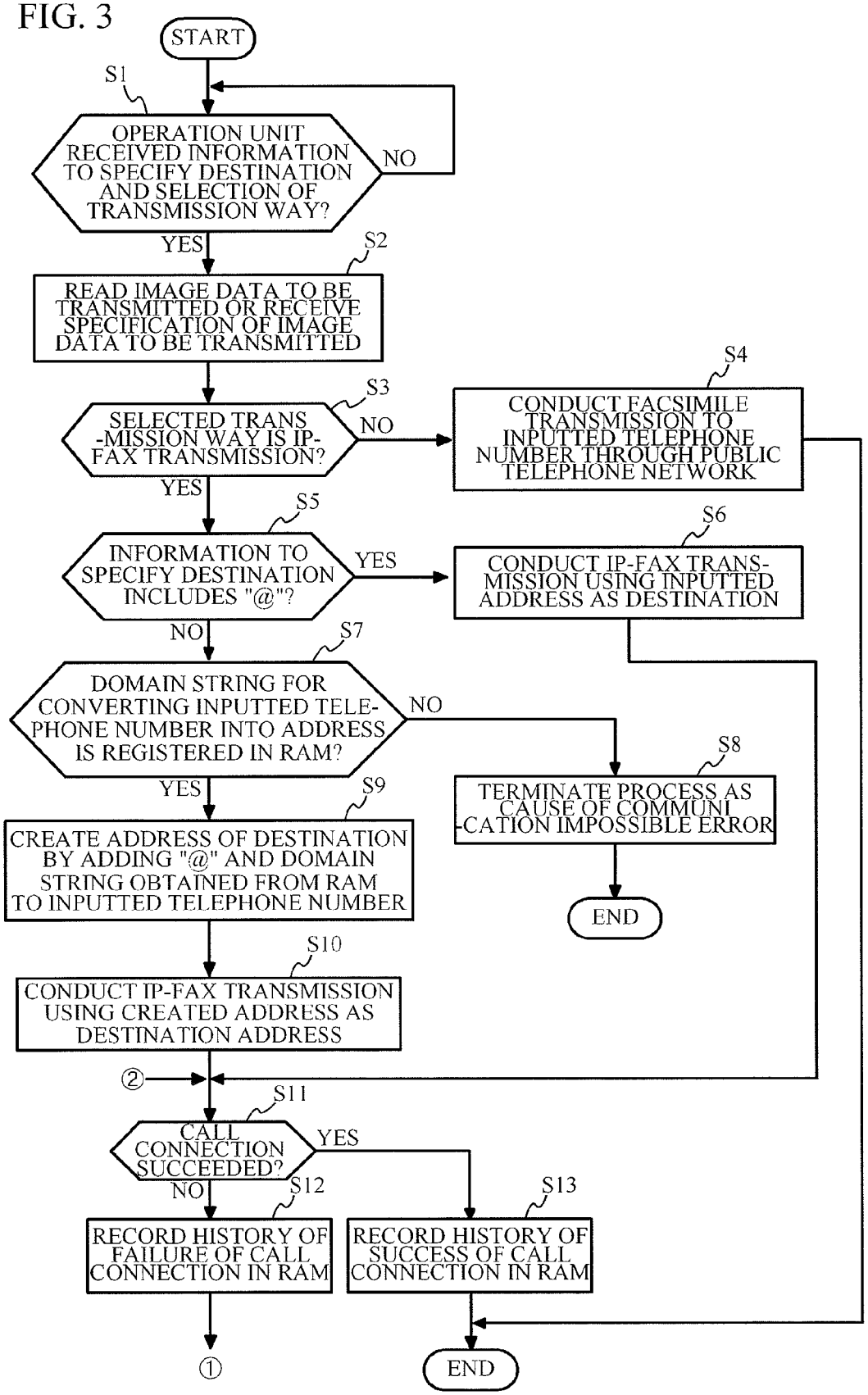
FIG. 3 is a flowchart illustrating a first process of the controller from a step S1 to a step S13.

A description will now be given of the process of the controller 10 with reference to the flowchart illustrated in FIG. 3.

The controller 10 determines whether the operation unit 51 received the information to specify the destination, and the selection of the transmission way from the user (step S1). The telephone number of the destination or the address of the destination can be used as the information to specify the destination. There are an analog FAX transmission using a public telephone network and the IP-FAX transmission using the IP network as the transmission way.

When it is determined that the operation unit 51 received the operation input from the user (step S1/YES), the controller 10 makes the scanner 20 read the image data to be transmitted based on the operation input received by the operation unit 51, or the controller 10 receives the specification of the image data to be transmitted from the image data stored in the image storage unit 30 in advance (step S2).

The controller 10 determines whether the transmission way of the image data received by the operation unit 51 is the IP-FAX transmission (step S3). When the selected transmission way is an analog FAX transmission (step S3/NO), the controller 10 controls the analog FAX 70 to conduct the analog FAX transmission to the telephone number input through the operation unit 51 (step S4). When the selected transmission way is the IP-FAX transmission (step S3/YES), the controller 10 determines whether the information to specify the destination received by the operation unit 51 includes an at mark "@" (step S5). When the selected transmission way is the IP-FAX transmission, the telephone number of the destination can be input as the information to specify the destination other than the address of the destination. When the controller 10 determines that the information to specify the destination includes an at mark (step S5/YES), it determines that the information to specify the destination is an address, and conducts the IP-FAX transmission with the IP-FAX 80 by using the address as the address of the destination (step S6).

When it is determined that the information to specify the destination does not include an at mark (step S5/NO), the controller 10 determines that the information to specify the destination is a telephone number. The controller 10 refers to the table stored in the RAM 13, and determines whether the domain string for converting the telephone number specifying the destination into the address of the destination is registered in the RAM 13 (step S7). When the controller 10 determines that the domain string for converting the telephone number specifying the destination into the address of the destination is not registered in the RAM 13 (step S7/NO), it terminates the process as a cause of the communication impossible error (step S8).

When the domain string for converting the telephone number specifying the destination into the address of the destination is registered in the RAM 13 (step S7/YES), the controller 10 converts the telephone number specifying the destination into the address by adding an at mark and the domain string obtained from the RAM 13 to the telephone number specifying the destination (step S9). The controller 10 transmits the image data to the other terminal with the IP-FAX 80 by using the converted address as the address of the destination (step S10).

The controller 10 determines whether the call connection with the other terminal with which the IP-FAX transmission is conducted succeeded (step S11). When a response code and a code that indicates that the other terminal is in a state that the other terminal can receive data are received, the controller 10 determines that the call connection succeeded (step S11/YES), and transmits the image data to the other terminal. The controller 10 stores the history of the success of the call connection in the RAM 13 (step S13). The history of the success of the call connection includes the address of destination, the time that the call connection succeeded and the like.

When the error code is returned as the response from a proxy server which relays a call connection request transmitted from the communication terminal 1 to the other terminal, the controller 10 determines that the call connection failed (step S11/NO). In this case, the controller 10 stores the history of the failure of the call connection in the RAM 13 (step S12). The history of the failure of the call connection includes the address of the destination, the error code reported by the proxy server, the reception time of the error code, and the like, for example.

Figure 4:
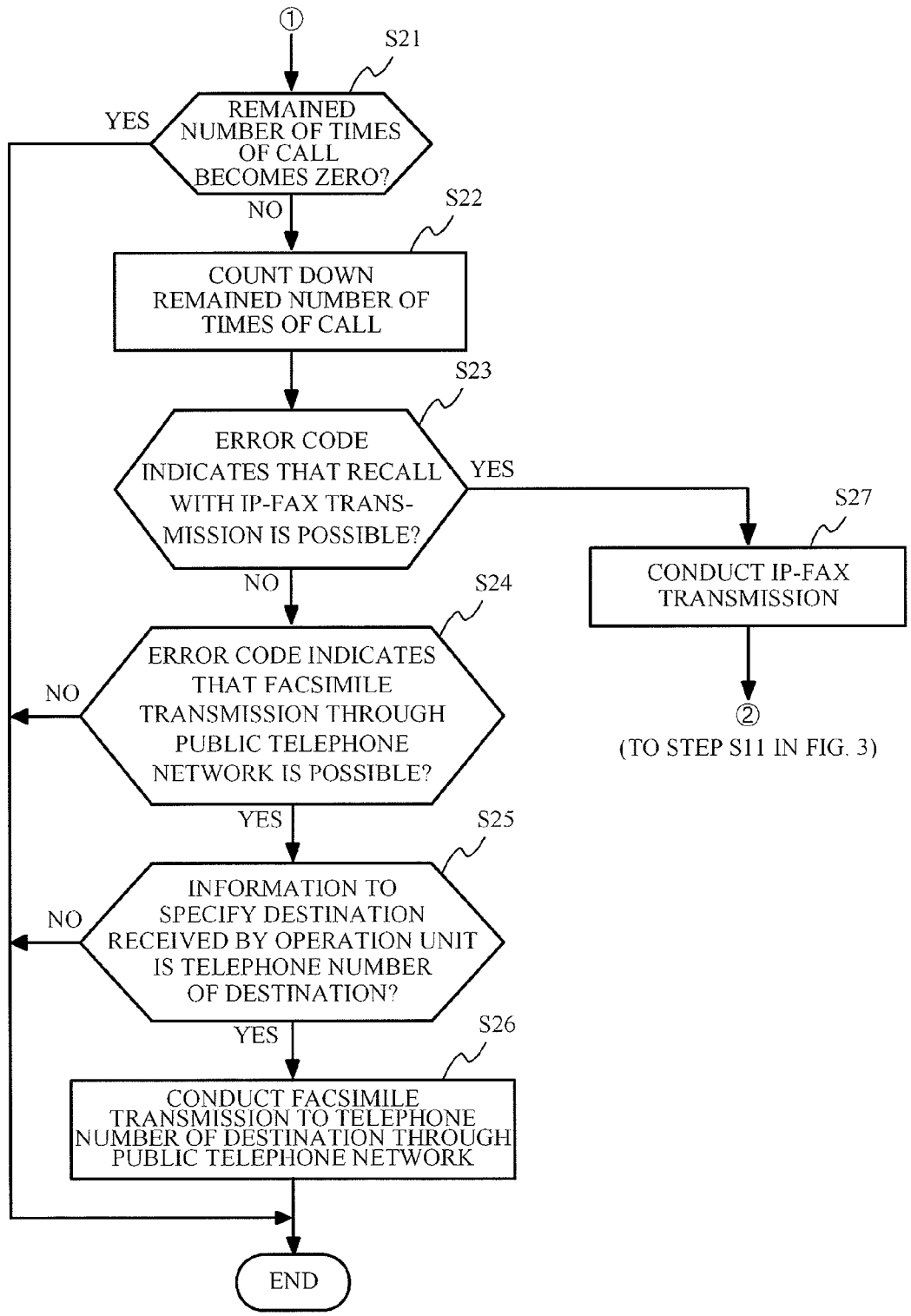
FIG. 4 is a flowchart illustrating the first process of the controller following the flowchart illustrated in FIG. 3.

A description will now be given of the process of the controller after storing the history of the failure of the call connection, with reference to a flowchart illustrated in FIG. 4.

When the call connection failed, the controller 10 determines whether the remained number of times of the call stored in the RAM 13 becomes zero (step S21). A default value of the number of times capable of calling the call connection request to the other terminal again when the call connection failed is stored in the NVRAM 14. The controller 10 stores the default value stored in the NVRAM 14 to the RAM 13 when the communication terminal 1 is started up, and counts down the remained number of times of the call every time the call connection fails. When the remained number of times of the call stored in the RAM 13 becomes zero (step S21/YES), this process is terminated. When the remained number of times of the call is more than zero (step S21/NO), the controller 10 counts down the remained number of times of the call stored in the RAM 13 (step S22). The controller 10 refers to the history of the failure of the call connection stored in the RAM 13, and analyzes the error code (step S23). When the error code indicates that the re-call with the IP-FAX transmission is possible (step S23/YES), the controller 10 uses same address information, and conducts the IP-FAX transmission with the IP-FAX 80 again (step S27), and repeats the process from the step S11 described above.

When the error code indicates that the re-call with the IP-FAX transmission is impossible because the line is busy for example (step S23/NO), the controller 10 determines whether the error code indicates that the facsimile communication using a public telephone network is possible (step S24). When the controller 10 determines that the error code does not indicate that the facsimile transmission using a public telephone network is possible (step S24/NO), it terminates the process. When the controller 10 determines that the error code indicates that the analog fax transmission using a public telephone network is possible (step S24/YES), it determines whether the information to specify the destination received by the operation unit 51 is the telephone number of the destination (step S25). When the information to specify the destination is the telephone number of the destination (step S25/YES), the controller 10 controls the analog FAX 70 to conduct the analog fax transmission to the telephone number received by the operation unit 51 (step S26). When the telephone number of the destination is the international telephone number, the controller 10 controls the analog FAX 70 to conduct the analog fax transmission to the international telephone number received by the operation unit 51 (step S26).

As described above, in the process illustrated in FIG. 3 and FIG. 4, when the information to specify the destination is the telephone number and the IP-FAX transmission fails, the analog fax transmission through the public telephone network is conducted. When the information to specify the destination received by the operation unit 51 is the address used for the IP-FAX transmission, the analog FAX transmission through the public telephone network is not conducted.

Figure 5:
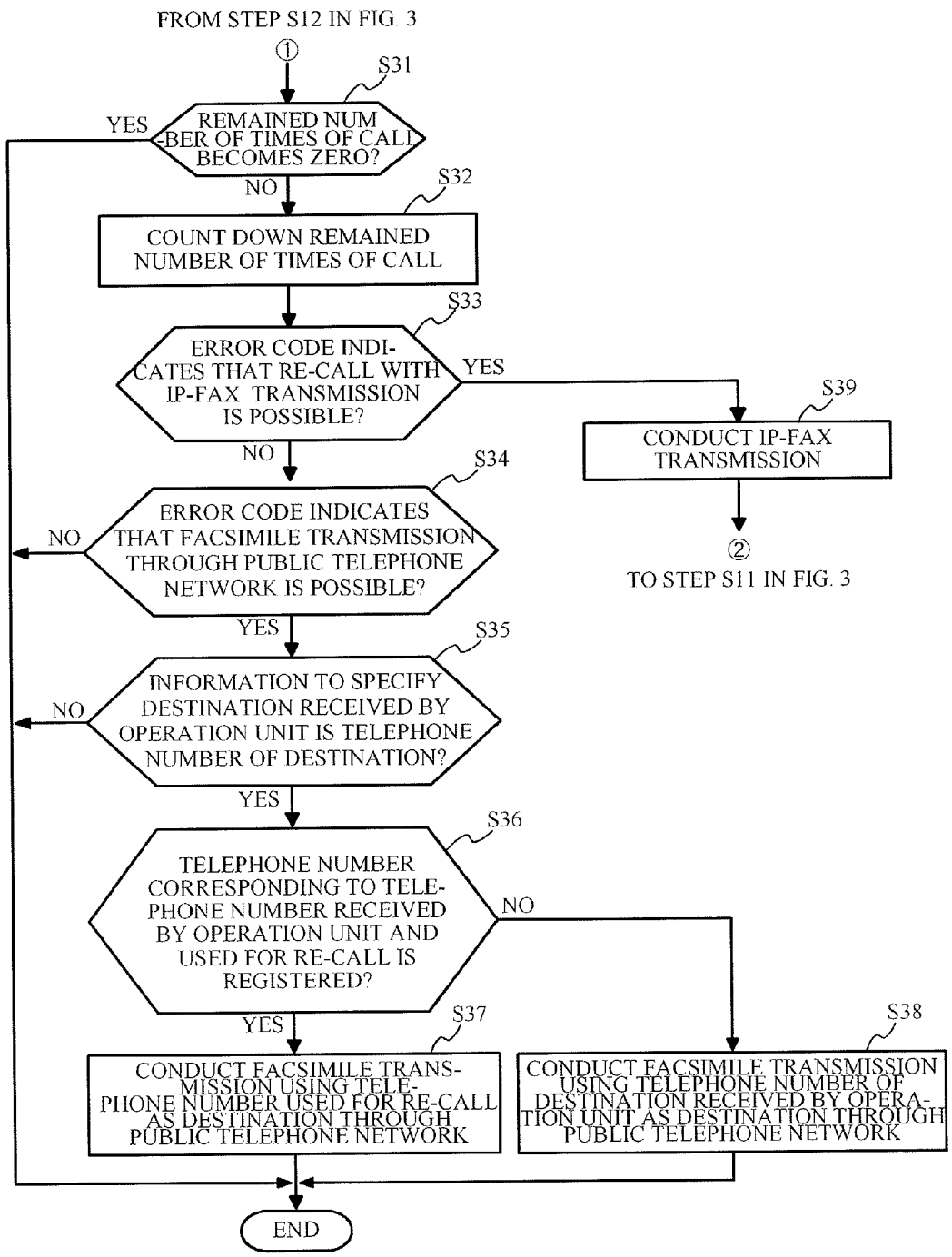
FIG. 5 is a flowchart illustrating a second process of the controller.

A description will now be given of a second process of the controller 10, with reference to the flowchart illustrated in FIG. 5. In the second process, preceding steps of the step S31 are same as steps of the flowchart illustrated in FIG. 3. Thus, the description will be omitted. Moreover, in the second process, steps S31 through S35 and S39 illustrated in FIG. 5 are same as steps S21 through S25 and S27 of the flowchart illustrated in FIG. 4. Thus, the description will be omitted.

When the controller 10 determines that the error code indicates that the analog FAX transmission using the public telephone network is possible (step S34/YES), it determines whether the information to specify the destination received by the operation unit 51 in the step S1 is the telephone number of the destination (step S35). When the information to specify the destination received by the operation unit 51 is the telephone number of the destination (step S35/YES), the controller 10 determines whether there is the telephone number registered as the telephone number used for the re-call that is stored in relation to the telephone number of the destination in the RAM 13 by referring to the RAM 13 (step S36). For example, in the case that the multiple telephone lines are connected, and one of them is connected to the extension line, the analog FAX transmission is not able to be conducted by calling to the extension line. To prevent this kind of problem, when the telephone line number used for the re-call is stored in the RAM 13, the controller 10 conducts the analog FAX transmission to the other terminal through the public telephone network by using the telephone line corresponding to the line number (step S37). When the telephone line number used for the re-call is not stored in the RAM 13, the controller 10 conducts the analog FAX transmission through the public telephone network by using a telephone line selected based on the predetermined selection method (step S38). It may be possible that the telephone line number used for the re-call is not registered in the RAM 13 in advance. The telephone line number received by the UI 50 when the IP-FAX transmission with the IP-FAX 80 is conducted may be used. For example, the controller 10 may display a list of telephone line numbers registered in the RAM 13 in advance on the UI 50, and may receive the selection of the telephone line number used for the re-call from displayed telephone line numbers.

Thus, in this second process, if the telephone line number used for the re-call is registered in the RAM 13, the analog FAX transmission to the other terminal through the public telephone network is conducted by using the telephone line corresponding to the telephone line number.

Figure 6:
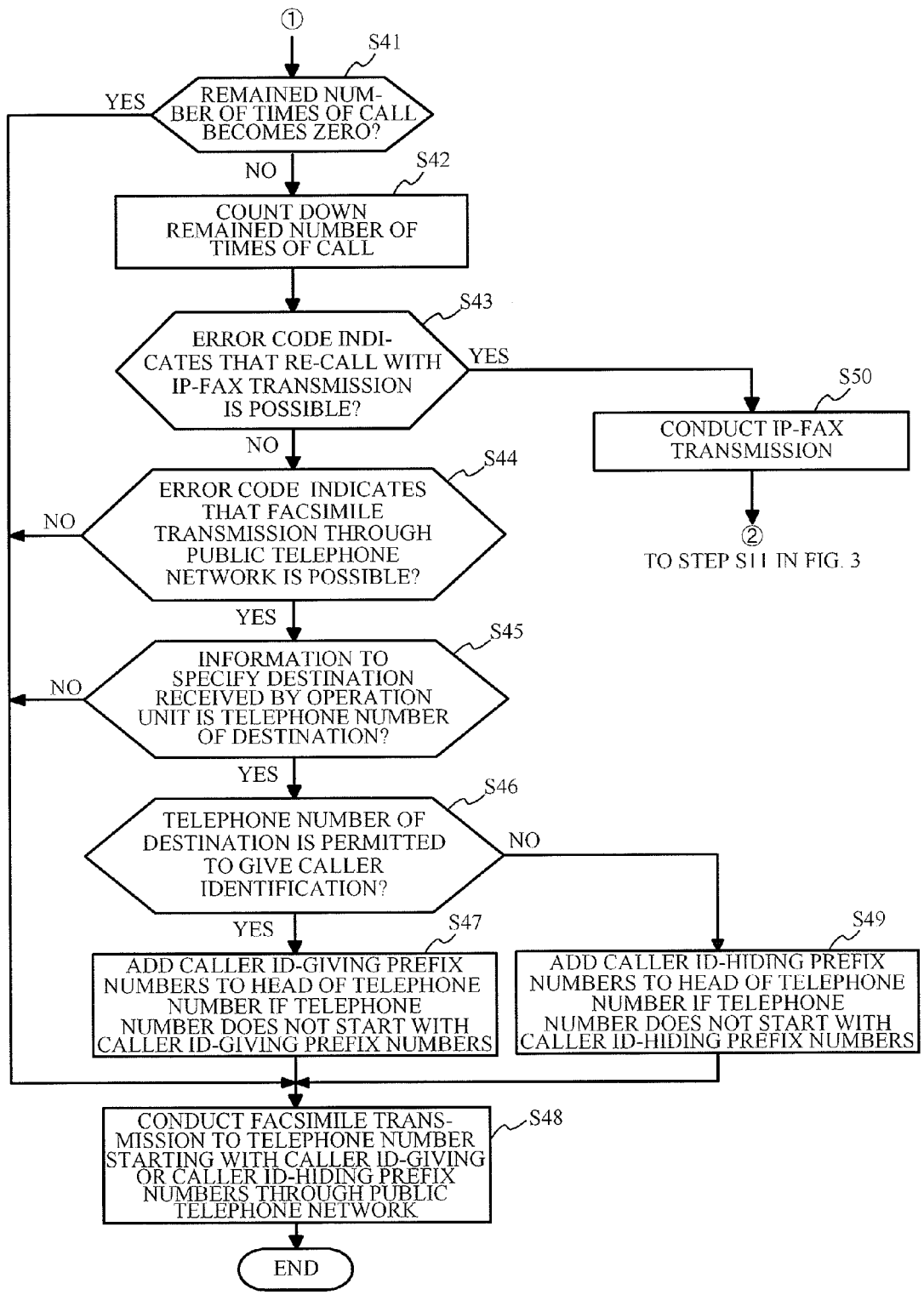
FIG. 6 is a flowchart illustrating a third process of the controller.

A description will now be given of a third process of the controller 10 with reference to the flowchart illustrated in FIG. 6. In the third process, the preceding steps of the step S41 of the flowchart illustrated in FIG. 6 are same as steps of the flowchart illustrated in FIG. 3. Thus the description will be omitted. Moreover, in the third process, steps S41 through S45 and S50 of the flowchart illustrated in FIG. 6 are same as steps S21 through S25 and S27 of the flowchart illustrated in FIG. 4. Thus, the description will be omitted.

When the controller 10 determines that the error code indicates that the analog FAX transmission using the public telephone network is possible (step S44/YES), it determines whether the information to specify the destination received by the operation unit 51 is the telephone number of the destination (step S45). When the information to specify the destination received by the operation unit 51 is the telephone number of the destination (step S45/YES), the controller 10 refers to the RAM 13, and determines whether the telephone number of the destination is permitted to give the caller identification (step S46). When the telephone number of the destination is permitted to give the caller identification, the controller 10 determines whether the telephone number of the destination starts with the caller identification-giving prefix numbers (referred to as caller id-giving prefix numbers in the drawings). When the telephone number of the destination does not start with the caller identification-giving prefix numbers, the controller 10 adds the caller identification-giving prefix numbers to the head of the telephone number of the destination (step S47). Then the controller 10 controls the analog FAX 70 to conduct the analog FAX transmission to the telephone number of the destination to which the caller identification-giving prefix numbers was added (step S48).

When the telephone number of the destination inputted in the step S1 is not permitted to give the caller identification (step S46/NO), the controller 10 determines whether the telephone number of the destination starts with the caller identification-hiding prefix numbers (referred to as caller id-hiding prefix numbers in the drawings). When the telephone number of the destination does not start with the caller identification-hiding prefix numbers, the controller 10 adds the caller identification-hiding prefix numbers to the head of the telephone number of the destination (step S49). Then the controller 10 controls the analog FAX 70 to conduct the analog FAX transmission to the telephone number of the destination to which the caller identification-hiding prefix numbers was added (step S48).

Thus, in the third process, if the input telephone number of the destination is set to give the caller identification, the analog fax transmission is conducted with giving the caller identification and if it is not set to give the caller identification, the analog FAX transmission is conducted without giving the caller identification.

It is not necessary to register the permission for giving the caller identification, in advance. For example, the UI 50 may receive the setting information to decide whether to give the caller identification, and the controller 10 may decide whether the caller identification is given based on received setting information, when the IP-FAX transmission with the IP-FAX 80 is conducted.

Figure 7:
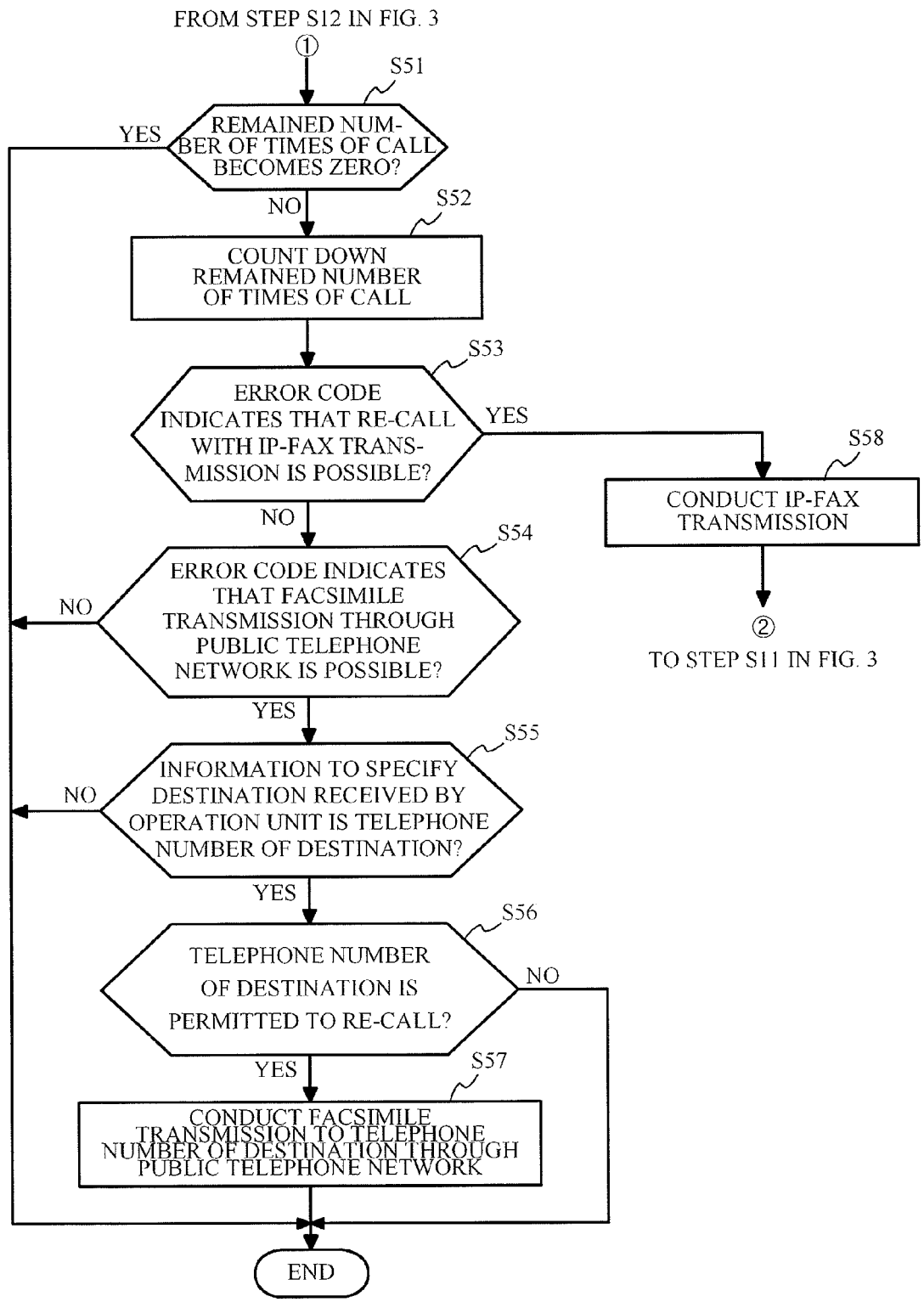
FIG. 7 is a flowchart illustrating a fourth process of the controller.

A description will now be given of a fourth process of the controller 10 with reference to the flowchart illustrated in FIG. 7. In the fourth process, the preceding steps of the step S51 illustrated in FIG. 7 are same as steps of the flowchart illustrated in FIG. 3. Thus the description will be omitted. Moreover, in the fourth process, steps S51 through S55 and S58 illustrated in FIG. 7 are same as steps S21 through S25 and S27 of the flowchart illustrated in FIG. 4. Thus the description will be omitted.

When the controller 10 determines that the error code indicates that the analog FAX transmission using the public telephone network is possible (step S54/YES), it determines whether the information to specify the destination received by the operation unit 51 in the step S1 is the telephone number of the destination (step S55). When the information to specify the destination received by the operation unit 51 is the telephone number of the destination (step S55/YES), the controller 10 refers to the RAM 13, and determines whether the telephone number of the destination inputted in the step S1 is a telephone number which is permitted to re-call (step S56). When it is determined that the telephone number of the destination is the telephone number which is permitted to re-call as the reference result of the RAM 13 (step S56/YES), the controller 10 controls the analog FAX 70 to conduct the analog FAX transmission to the telephone number of the destination (step S57). When it is determined that the telephone number of the destination is the telephone number which is not permitted to re-call as the reference result of the RAM 13 (step S56/NO), the controller 10 does not conduct the analog FAX transmission, and terminates the process.

Therefore, in the fourth process, when the telephone number input through the operation unit 51 is the telephone number permitted to re-call, the analog FAX transmission through the public telephone network is conducted.

Figure 8:
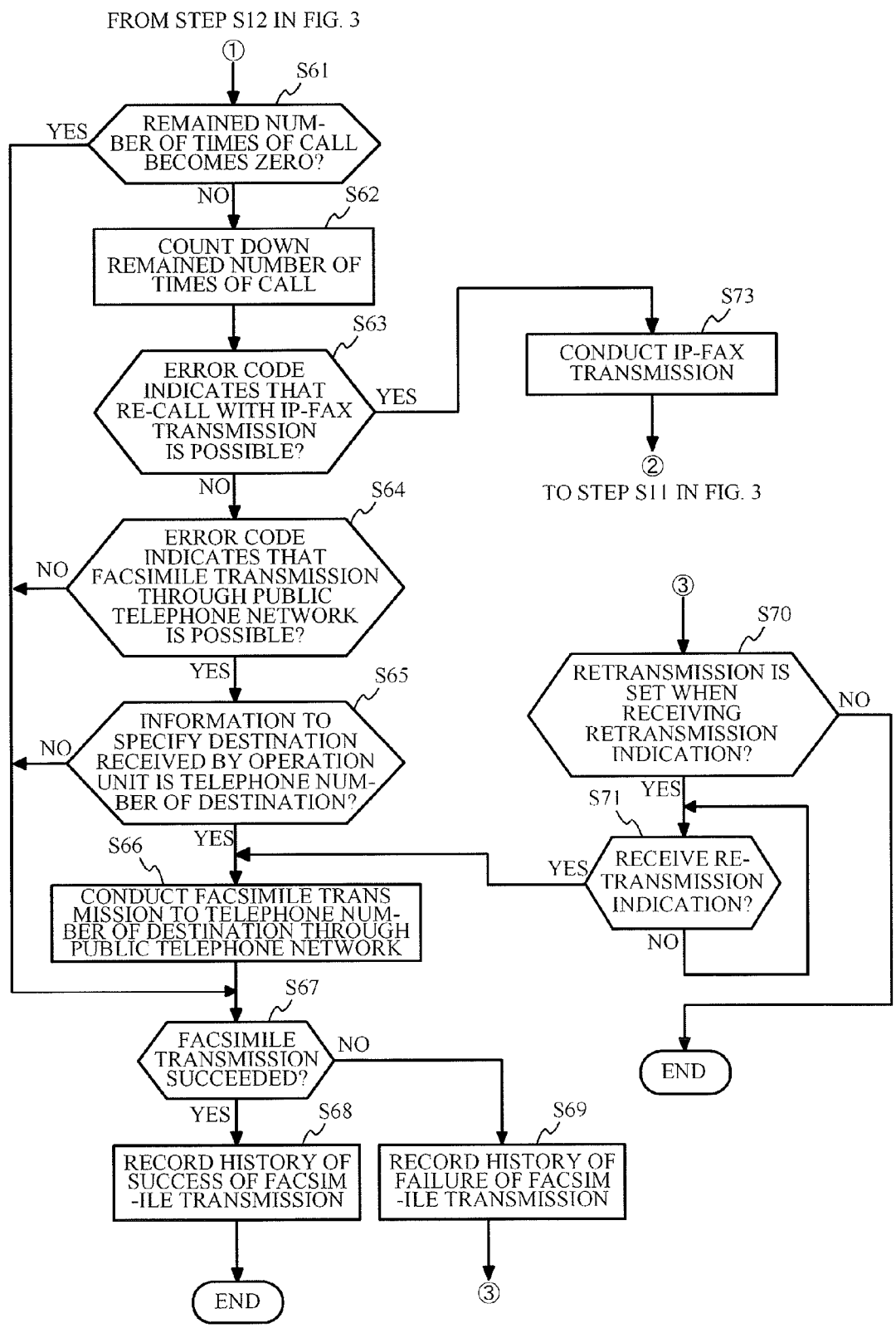
FIG. 8 is a flowchart illustrating a fifth process of the controller.

A description will now be given of a fifth process of the controller 10 with reference to the flowchart illustrated in FIG. 8. In the fifth process, the preceding steps of the step S61 illustrated in FIG. 8 are same as steps of the flowchart illustrated in FIG. 3. Thus the description will be omitted. Moreover, in the fifth process, steps S61 through S66 and S73 are same as steps S21 trough S26 of the flowchart illustrated in FIG. 4. Thus the description will be omitted.

In the step S65, when the information to specify the destination received by the operation unit 51 is the telephone number of the destination (step S65/YES), the controller 10 controls the analog FAX 70 to conduct the analog FAX transmission to the telephone number of the destination (step S66). The controller 10 determines whether the analog FAX transmission succeeded (step S67). When the analog FAX transmission succeeded (step S67/YES), the controller 10 records the history of the success of transmission in the RAM 13 (step S68), and terminates the process. The controller 10 records the telephone number of the destination, the transmission start time, the time took for the transmission, and the facsimile standard (eg. G3 or G4) used for the transmission as the history of the success of transmission.

When the analog FAX transmission failed (step S67/NO), the controller 10 records the history of the failure of transmission (step S69). The controller 10 records the telephone number of the destination, the transmission start time, and the facsimile standard (eg. G3 or G4) used for the transmission as the history of the failure of transmission. Then the controller 10 refers to the history management table illustrated in FIG. 2B and determines whether the setting information is set to retransmit after the retransmission indication (the setting information illustrates in FIG. 2B), when there is the image data which is not transmitted yet in the image storage unit 30 (step S70). When the setting information is not set to retransmit after the retransmission is indicated (step S70/NO), the controller 10 terminates the process. When the setting information is set to retransmit after the retransmission is indicated (step S70/YES), the controller 10 determines whether the retransmission was indicated (step S71). When the retransmission is indicated (step S71/YES), the controller 10 controls the analog FAX 70 to conduct the analog FAX transmission to the telephone number used for the analog FAX transmission at the previous time (step S66). Then the controller 10 repeats the processes after the step S67.

Therefore, in the fifth process, when the IP-FAX transmission failed and the analog FAX transmission through the public telephone network failed, the analog FAX transmission through the public telephone network is conducted again based on the setting.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A communication terminal comprising:
    a first communication unit that is coupled to an IP (Internet Protocol) network and conducts a facsimile transmission through the IP network;
    a second communication unit that is coupled to a public telephone network and conducts a facsimile transmission through the public telephone network;
    a communication error detection unit that detects a communication error of the first communication unit;
    a reception unit that receives, via a user input, either of address information that the first communication unit uses for calling to the IP network and a telephone number, having a different format than the address information, that the second communication unit uses for calling to the public telephone network as information to specify a destination for the facsimile transmission and receives a selection of a communication unit used for a facsimile transmission from the first communication unit and the second communication unit;
    a storage unit that stores conversion information for converting a received telephone number into address information that the first communication unit uses for calling to the IP network, in a case that the first communication unit is selected as the communication unit used for a facsimile transmission and the reception unit receives an input of a telephone number as the information to specify the destination; and
    a control unit that controls the first communication unit to call to the IP network by using the address information that the reception unit receives in a case that the communication unit selected through the reception unit is the first communication unit and the reception unit receives the address information, and to call to the IP network by using the address information corresponding to the destination which is converted from the telephone number received by the reception unit by referring to the storage unit in a case that the communication unit selected through the reception unit is the first communication unit and the reception unit receives the telephone number,
    wherein the control unit controls the second communication unit to re-call to the public telephone network by using the telephone number in a case that the communication error detection unit detects the communication error when the first communication unit calls to the IP network and that the address information used for calling to the IP network is the address information corresponding to the destination which is converted from the telephone number received by the reception unit, and
    wherein the control unit controls the second communication unit not to re-call to the public telephone network in a case that the communication error detection unit detects the communication error when the first communication unit calls to the IP network and the address information used for calling to the IP network is the address information received by the reception unit via the user input.

2. The communication terminal according to claim 1, wherein the control unit controls the second communication unit not to re-call to the public telephone network in a case that the communication error detection unit detects the communication error when the first communication unit calls to the IP network, and that the address information used for calling to the IP network is the address information received by the reception unit.

3. The communication terminal according to claim 1, wherein in a case that the communication error detection unit detects the communication error when the first communication unit calls to the IP network and that the address information used for calling to the IP network is the address information corresponding to the destination which is converted from the international telephone number received by the reception unit, the control unit controls the second communication unit to re-call to the public telephone network by using the international telephone number.

4. The communication terminal according to claim 1, wherein the storage unit stores telephone numbers corresponding to respective telephone lines when the destination has multiple telephone lines;
    the reception unit receives the selection of the telephone number corresponding to the telephone line used for the re-call from telephone numbers of the multiple telephone lines stored in the storage unit when the second communication unit is controlled to re-call; and
    the control unit controls the second communication unit to re-call to the public telephone network by using the telephone number corresponding to the telephone line used for the re-call which is received by the reception unit in a case that the communication error detection unit detects the communication error when the first communication unit calls to the IP network and that the address information used for calling to the IP network is the address information corresponding to the destination which is converted from the telephone number received by the reception unit.

5. The communication terminal according to claim 1, wherein the storage unit stores information indicating whether the caller identification is given to the destination when calling to the IP network;
    the control unit controls the second communication unit to give the caller identification in re-calling in a case that the communication error detection unit detects the communication error when the first communication unit calls to the IP network, that the address information used for calling to the IP network is the address information corresponding to the destination which is converted from the telephone number received by the reception unit and that the telephone number is stored in the storage unit as the telephone number permitted to give the caller identification, or in a case that the reception unit receives the input of the setting to give the caller identification when the first communication unit calls to the IP network; and
    the control unit controls the second communication unit not to give the caller identification in a case that the reception unit does not receive the input of the setting to give the caller identification when the first communication unit calls to the IP network.

6. The communication terminal according to claim 1, wherein the storage unit stores a telephone number used for calling to the public telephone network, and information indicating whether the second communication unit re-calls to the public telephone network when the first communication unit fails to call to the IP network; and the control unit determines whether the telephone number is permitted to re-call by referring to the storage unit and controls the second communication unit to re-call to the telephone number, in a case that the communication error detection unit detects the communication error when the first communication unit calls to the IP network and that the address information used for calling to the IP network is the address information corresponding to the destination which is converted from the telephone number received by the reception unit.

7. The communication terminal according to claim 1, wherein the reception unit that receives the input of the setting information indicating whether the re-call to the same telephone number is conducted when the second communication fails to re-call;

the control unit controls the second communication unit to re-call to the telephone number in a case that the communication error detection unit detects the communication error when the first communication unit calls to the IP network and that the address information used for calling to the IP network is the address information corresponding to the destination which is converted from the telephone number received by the reception unit; and the control unit refers to the setting information when the second communication unit fails to re-call to the telephone number, and controls the second communication unit to re-call to the telephone number when the setting information is set to re-call to the same telephone number.

8. The communication terminal according to claim 1, wherein the reception unit is configured to receive a user input of the address information from a user.

9. The communication terminal according to claim 1, wherein in the case that the first communication unit is selected as the communication used for the facsimile transmission, the control unit is configured to determine which of the telephone number and the address information is received by the reception unit.

10. The communication terminal according to claim 9, wherein the control unit is configured to determine whether the user input received by the reception unit includes an @ mark in order to determine which of the telephone number and the address information is received by the reception unit.

11. A non-transitory computer readable medium causing a computer to execute a process, the process comprising:

receiving an input, from a user, of either of address information used when a first communication unit, which is coupled to an IP network and conducts a facsimile transmission through the IP network, calls to the IP network and a telephone number, having a different format than the address information, used when a second communication unit, which is coupled to a public telephone network and conducts a facsimile transmission through the public telephone network, calls to the public telephone network as information to specify a destination of a facsimile transmission and receiving a selection of a communication unit to be used for a facsimile transmission;

controlling the first communication unit to call to the IP network, in a case that a communication unit which is selected is the first communication unit and the input of the telephone number is received, by using the address information corresponding to the destination which is converted from the received telephone number by referring to conversion information stored in a storage, and to call to the IP network, in a case that the communication unit which is selected is the first communication unit and the input of the address information is received, by using the received address information; and controlling the second communication unit to re-call to the public telephone network, in a case that a communication error is detected when the first communication unit calls to the IP network and that the address information used for calling to the IP network is the address information corresponding to destination converted from the received telephone number, by using the telephone number, wherein the process further comprises controlling the second communication unit not to re-call to the public telephone network in a case that the communication error is detected when the first communication unit calls to the IP network and the address information used for calling to the IP network is the address information received by the receiving from the user.

12. A communication terminal comprising:

a first communication unit that conducts a facsimile communication through the use of an IP network;

a second communication unit that conducts a facsimile communication by an analog method through the use of a public telephone network;

a reception unit that receives, via a user input, either of a telephone number of a destination and an address of the destination, having a different format than the telephone number;

a control unit that controls the second communication unit to conduct the facsimile communication by the received telephone number as a re-call in a case that the facsimile communication by the first communication unit based on the received telephone number is conducted and the communication error is detected when the reception unit receives the telephone number, and controls the second communication unit not to conduct the facsimile communication as the re-call in a case that the facsimile communication by the first communication unit based on the received address is conducted and the communication error is detected when the reception unit receives the address, wherein the control unit controls the second communication unit not to re-call to the public telephone network in a case that the communication error is detected when the first communication unit calls to the IP network and the address information used for calling to the IP network is the address information received by the reception unit via the user input.

* * * * *